(12) United States Patent
Voronov et al.

(10) Patent No.: US 12,298,256 B2
(45) Date of Patent: May 13, 2025

(54) INSPECTION METHOD AND INSPECTION APPARATUS FOR PERFORMING THE SAME

(71) Applicant: Samsung Display Co., LTD., Yongin-si (KR)

(72) Inventors: Alexander Voronov, Suwon-si (KR); Jooseob Ahn, Hwaseong-si (KR); Hyeonsuk Guak, Suwon-si (KR); Kihun Kim, Cheonan-si (KR); Jekil Ryu, Suwon-si (KR); Hyeongmin Ahn, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 353 days.

(21) Appl. No.: 18/071,749

(22) Filed: Nov. 30, 2022

(65) Prior Publication Data

US 2023/0194437 A1    Jun. 22, 2023

(30) Foreign Application Priority Data

Dec. 16, 2021  (KR) .................. 10-2021-0180573

(51) Int. Cl.
| | |
|---|---|
| G01N 21/94 | (2006.01) |
| G01N 21/956 | (2006.01) |
| G06T 7/521 | (2017.01) |
| G06T 7/55 | (2017.01) |
| G01N 21/95 | (2006.01) |

(52) U.S. Cl.
CPC ........... *G01N 21/94* (2013.01); *G01N 21/956* (2013.01); *G06T 7/521* (2017.01); *G06T 7/55* (2017.01); *G01N 2021/9513* (2013.01); *G06T 2207/10016* (2013.01); *G06T 2207/20221* (2013.01)

(58) Field of Classification Search
CPC .. G01N 21/94; G01N 21/956; G01N 21/8806; G01N 21/8422; G06T 7/521; G06T 7/55; G06T 7/00; G06T 7/30; G01B 11/00; G01B 11/026

See application file for complete search history.

(56) References Cited

U.S. PATENT DOCUMENTS

| | | | |
|---|---|---|---|
| 6,313,913 B1 * | 11/2001 | Nakagawa | ............. G01N 21/94 250/225 |
| 8,218,138 B2 | 7/2012 | Nakano et al. | |
| 2013/0336574 A1 * | 12/2013 | Nasser-Ghodsi | ....... G06T 7/001 382/145 |

FOREIGN PATENT DOCUMENTS

| | | |
|---|---|---|
| JP | 2019-533166 | 11/2019 |
| KR | 10-0829501 | 5/2008 |
| KR | 10-1636055 | 7/2016 |
| KR | 10-2016-0131647 | 11/2016 |
| KR | 10-1678169 | 11/2016 |
| KR | 10-2017-0133113 | 12/2017 |
| KR | 10-2019-0077490 | 7/2019 |

(Continued)

*Primary Examiner* — Abdullahi Nur
(74) *Attorney, Agent, or Firm* — KILE PARK REED & HOUTTEMAN PLLC (57) ABSTRACT

An inspection method includes irradiating a laser to an inspection target, reflecting a first emitted laser from a transmission layer included in the inspection target, reflecting a second emitted laser from a scattering layer included in the inspection target, detecting a reference image from the second emitted laser; and measuring a separation distance obtained from the first emitted laser, based on the reference image.

19 Claims, 8 Drawing Sheets

(56) References Cited

FOREIGN PATENT DOCUMENTS

| KR | 10-2019-0077491 | 7/2019 |
| WO | 2018085233 | 5/2018 |

\* cited by examiner

INSPECTION METHOD AND INSPECTION APPARATUS FOR PERFORMING THE SAME

CROSS-REFERENCE TO RELATED APPLICATION(S)

This application claims priority to and benefits of Korean Patent Application No. 10-2021-0180573 under 35 U.S.C. § 119, filed in the Korean Intellectual Property Office (KIPO) on Dec. 16, 2021, the entire contents of which are incorporated herein by reference.

BACKGROUND

1. Technical Field

Implementations of the disclosure relate generally to an inspection method and an inspection apparatus for performing the inspection method.

2. Description of the Related Art

In case that a foreign material is generated in the process of manufacturing the display device, it is necessary to accurately detect the position of the foreign material. In order to detect the position of the foreign material, an inspection method of irradiating a laser to the display device and obtaining an image through the reflected laser is mainly used. However, according to the inspection method, it is difficult to accurately detect a position of a foreign material generated on a tilted, bent, or inclined display device.

SUMMARY

Embodiments provide an inspection method.

Embodiments provide an inspection apparatus for performing the inspection method.

An inspection method according to an embodiment may include irradiating a laser to an inspection target, reflecting a first emitted laser from a transmission layer included in the inspection target, reflecting a second emitted laser from a scattering layer included in the inspection target, detecting a reference image from the second emitted laser, and measuring a separation distance obtained from the first emitted laser, based on the reference image.

In an embodiment, the irradiating of the laser may include irradiating the laser to have an angle with respect to the inspection target.

In an embodiment, the first emitted laser and the second emitted laser may not intersect each other.

In an embodiment, the inspection method may further include obtaining an image stream from the first emitted laser and the second emitted laser.

In an embodiment, the inspection method may further include detecting the reference image having a uniform pattern in the image stream.

In an embodiment, the measuring of the separation distance may include measuring the separation distance based on an angle and between the laser and the inspection target and a vertical thickness of the transmission layer.

In an embodiment, the inspection method may further include obtaining a sub-image by reflecting the separation distance in an image obtained from the first emitted laser.

In an embodiment, the inspection method may further include merging the sub-image obtained by reflecting the separation distance with the image obtained from the first emitted laser.

In an embodiment, the separation distance may be measured by the following equation:

$$x = \frac{h}{\tan(a)}$$

wherein x is the separation distance, h is the vertical thickness of the transmission layer, and a is the angle between the laser and the inspection target substrate.

An inspection apparatus according to an embodiment may include a laser generator that irradiates a laser to an inspection target, an imaging part on which a first emitted laser and a second emitted laser are incident, and a controller that measures a separation distance obtained from the first emitted laser, based on a reference image obtained from the second emitted laser. The first emitted laser may be a laser reflected from a transmission layer included in the inspection target, and the second emitted laser may be a laser reflected from a scattering layer included in the inspection target.

In an embodiment, the laser may be irradiated to have a predetermined angle with the inspection target.

In an embodiment, the first emitted laser and the second emitted laser may not intersect each other.

In an embodiment, the controller may include an image stream obtaining part that obtains an image stream from the first emitted laser and the second emitted laser.

In an embodiment, the controller may further include a reference image detector that detects the reference image having a uniform pattern in the image stream.

In an embodiment, the controller may include a separation distance measuring part that measures the separation distance based on an angle between the laser and the inspection target and a vertical thickness of the transmission layer.

In an embodiment, the controller may include a sub-image obtaining part that obtains a sub-image by reflecting the separation distance in an image obtained from the first emitted laser.

In an embodiment, the controller may further include an image merging part that merges the sub-image obtained by reflecting the separation distance in the image obtained from the first emitted laser.

In an embodiment, the first and second emitted lasers reflected from the inspection target inclined with respect to the imaging part may be incident on the imaging part.

In an embodiment, the separation distance may be measured by the following equation:

$$x = \frac{h}{\tan(a)}$$

wherein x is the separation distance, h is the vertical thickness of the transmission layer, and a is the angle between the laser and the inspection target substrate.

Therefore, an inspection method according to the embodiments of the disclosure may include irradiating a laser to an inspection target, reflecting a first emitted laser from a transmission layer of the inspection target, reflecting a second emitted laser from a scattering layer of the inspection target, detecting a reference image from the second emitted laser, and measuring a separation distance obtained from the first emitted laser based on the reference image. Since the reference image is detected from the second emitted laser and the separation distance is measured based on the reference image, the position of the foreign material may be accurately detected regardless of the position and/or angle of the inspection target.

The technical objectives to be achieved by the disclosure are not limited to those described herein, and other technical objectives that are not mentioned herein would be clearly understood by a person skilled in the art from the description of the disclosure.

BRIEF DESCRIPTION OF THE DRAWINGS

The accompanying drawings, which are included to provide a further understanding of the disclosure and are incorporated in and constitute a part of this specification, illustrate embodiments of the disclosure together with the description.

DETAILED DESCRIPTION OF THE EMBODIMENTS

Illustrative, non-limiting embodiments will be more clearly understood from the following detailed description in conjunction with the accompanying drawings.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. The term "and/or" includes all combinations of one or more of which associated configurations may define. For example, "A and/or B" may be understood to mean "A, B, or A and B."

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 1:
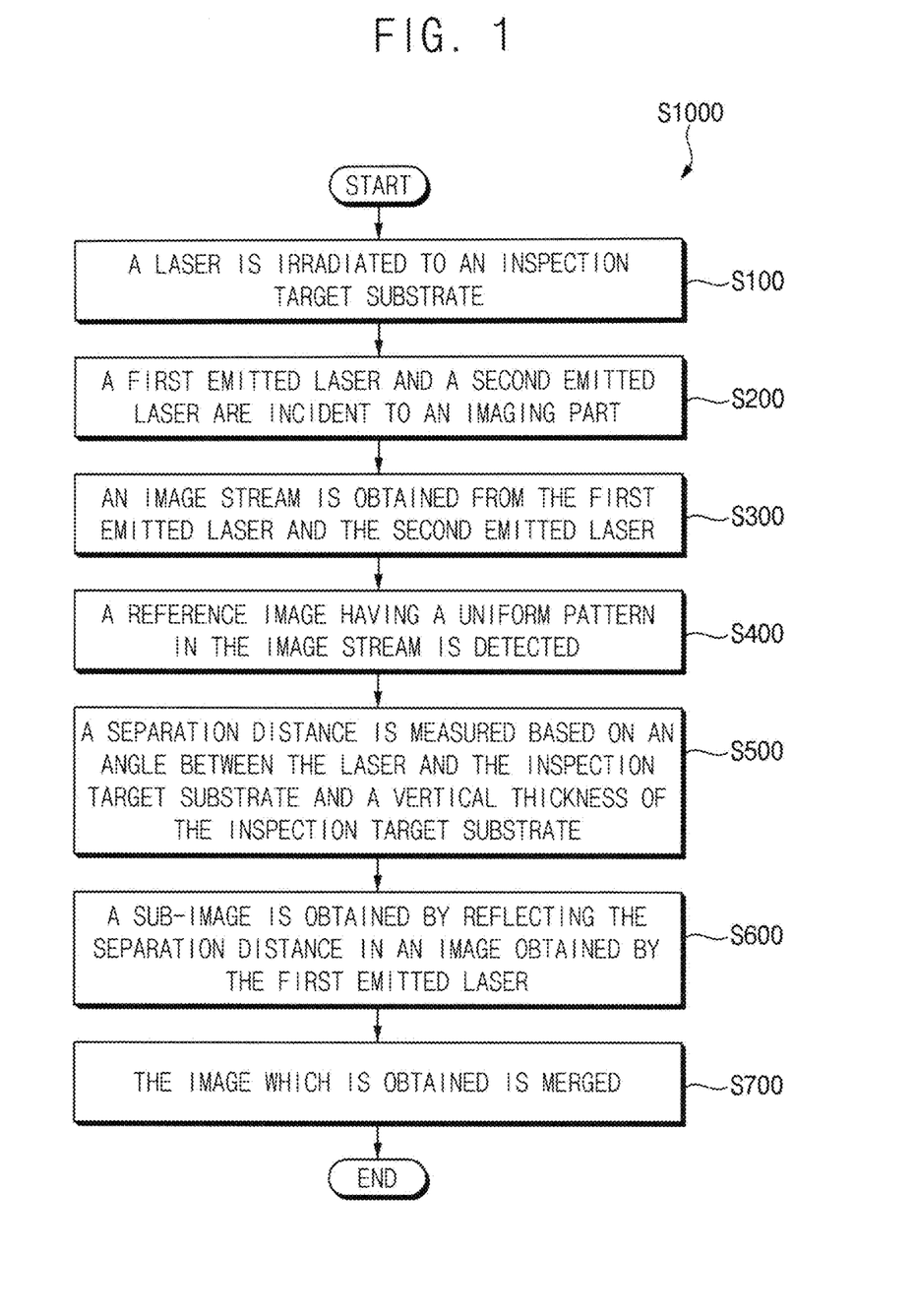
FIG. 1 is a flowchart schematically illustrating an inspection method according to an embodiment of the disclosure.
Figure 2:
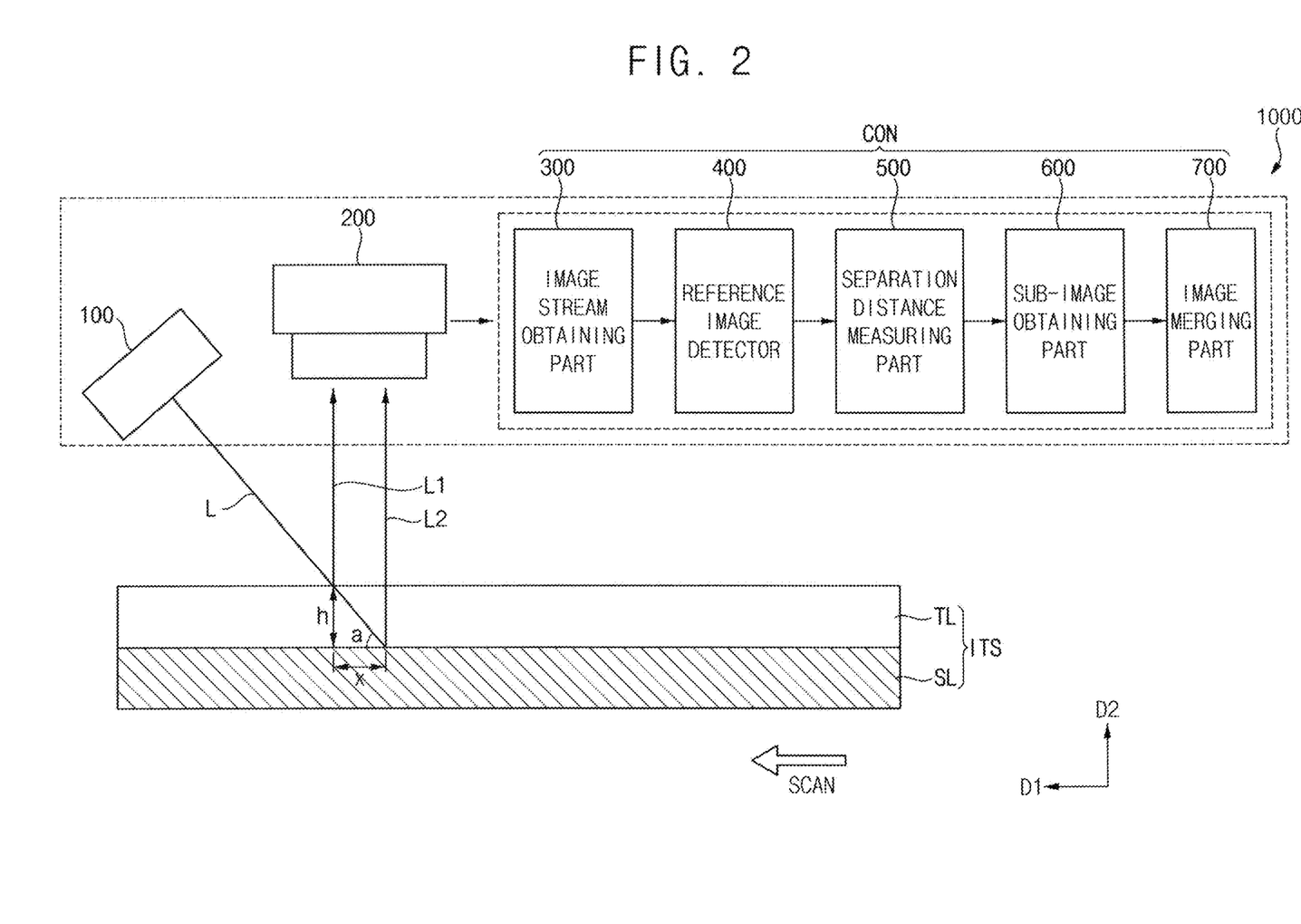
FIG. 2 is a conceptual diagram schematically illustrating an inspection apparatus for performing the inspection method of FIG. 1.

FIG. 1 is a flowchart schematically illustrating an inspection method according to an embodiment of the disclosure. FIG. 2 is a conceptual diagram schematically illustrating an inspection apparatus for performing the inspection method of FIG. 1.

Referring to FIGS. 1 and 2, in an inspection method (S1000) according to an embodiment of the disclosure, a laser L may be irradiated to an inspection target substrate (or inspection target) ITS (S100), a first emitted laser L1 and a second emitted laser L2 may be incident on an imaging part (S200), and an image stream (e.g., an image stream 350 of FIG. 3) may be obtained from the first emitted laser L1 and the second emitted laser L2 (S300), a reference image having a uniform pattern (e.g., a reference image 450 of FIG. 4) may be detected from the image stream 350 (S400), a separation distance x may be measured based on an angle a between the laser L and the inspection target substrate ITS and a vertical thickness h of the inspection target substrate ITS (S500), a sub-image (e.g., a sub-image 650 of FIG. 6) may be obtained by reflecting the separation distance x in an image obtained by the first emitted laser L1 (S600), and the sub-image which is obtained may be merged (S700).

In an embodiment, the inspection method S1000 may be performed by an inspection apparatus 1000. The inspection apparatus 1000 may include at least one of a laser generator 100, an imaging part 200, and a controller CON. The controller CON may include at least one of an image stream obtaining part 300, a reference image detector 400, a separation distance measuring part 500, a sub-image obtaining part 600, and an image merging part 700.

The laser generator 100 may irradiate the laser L to the inspection target substrate ITS. The laser L may have an angle (e.g., a predetermined or selected angle) a with the inspection target substrate ITS. The laser L may be reflected from a transmission layer TL and a scattering layer SL, respectively. A laser reflected from the transmission layer TL may be defined as the first emitted laser L1, and a laser reflected from the scattering layer SL may be defined as the second emitted laser L2.

In an embodiment, the first emitted laser L1 and the second emitted laser L2 may not overlap (or intersect) each other. In other words, the first emitted laser L1 and the second emitted laser L2 incident on the imaging part 200 may not overlap each other and may be spaced apart from each other. Accordingly, in the imaging part 200, a first image may be obtained from the first emitted laser L1 and a second image may be obtained from the second emitted laser L2.

In an embodiment, the inspection target substrate ITS may include at least one of the transmission layer TL and the scattering layer SL. The transmission layer TL may be disposed on the scattering layer SL. The transmission layer TL may be a layer that transmits most of the laser L, and the scattering layer SL may be a layer that scatters most of the laser L. For example, in case that the inspection target substrate ITS is a display device, the transmission layer TL may be a window formed of plastic, and the scattering layer SL may be an emission layer including pixels. However, the disclosure is not limited thereto.

In an embodiment, the inspection target substrate ITS may move in a first direction D1 (e.g., a horizontal direction), and the first and second emitted lasers L1 and L2 may proceed in a second direction D2 intersecting the first direction D1. The inspection target substrate ITS may be positioned in a direction parallel to the first direction D1.

The imaging part 200 may obtain an image by recognizing the laser. In an embodiment, the first emitted laser L1 and the second emitted laser L2 may be incident on the imaging part 200. As described above, the first emitted laser L1 and the second emitted laser L2 may not overlap each other.

Figure 3:
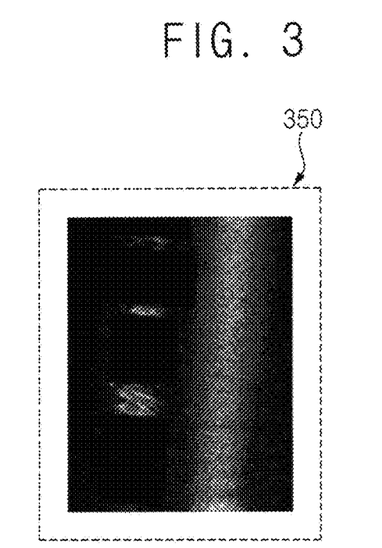
FIG. 3 is a diagram schematically illustrating an image stream obtained by an image stream obtaining part included in the inspection apparatus of FIG. 2.

The image stream obtaining part 300 may obtain the image stream 350 from the first emitted laser L1 and the second emitted laser L2. The image stream 350 may be an image recognized by the imaging part 200 while the inspection target substrate ITS is scanned. For example, the image stream 350 may be an image obtained from all lasers incident on the imaging part 200. The image stream 350 may include at least one of the first image obtained from the first emitted laser L1 and the second image obtained from the second emitted laser L2.

Figure 4:
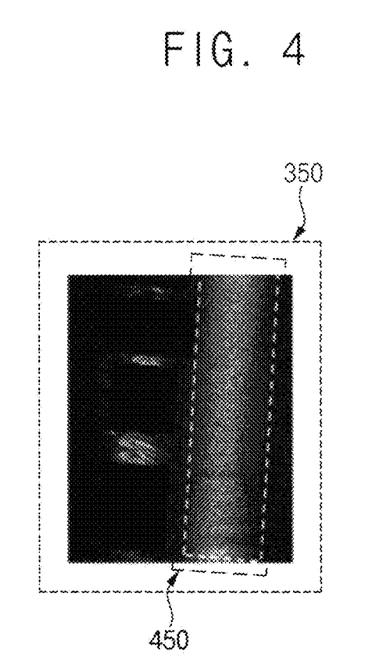
FIG. 4 is a diagram schematically illustrating a reference image detected by a reference image detector included in the inspection apparatus of FIG. 2.

The reference image detector 400 may detect the reference image 450, having the uniform pattern, from the image stream 350. For example, in case that the laser L is reflected by the scattering layer SL and is incident on the imaging part 200, it may be recognized as a bright image having a uniform stripe pattern. The reference image detector 400 may detect the bright image as the reference image 450.

Figure 5:
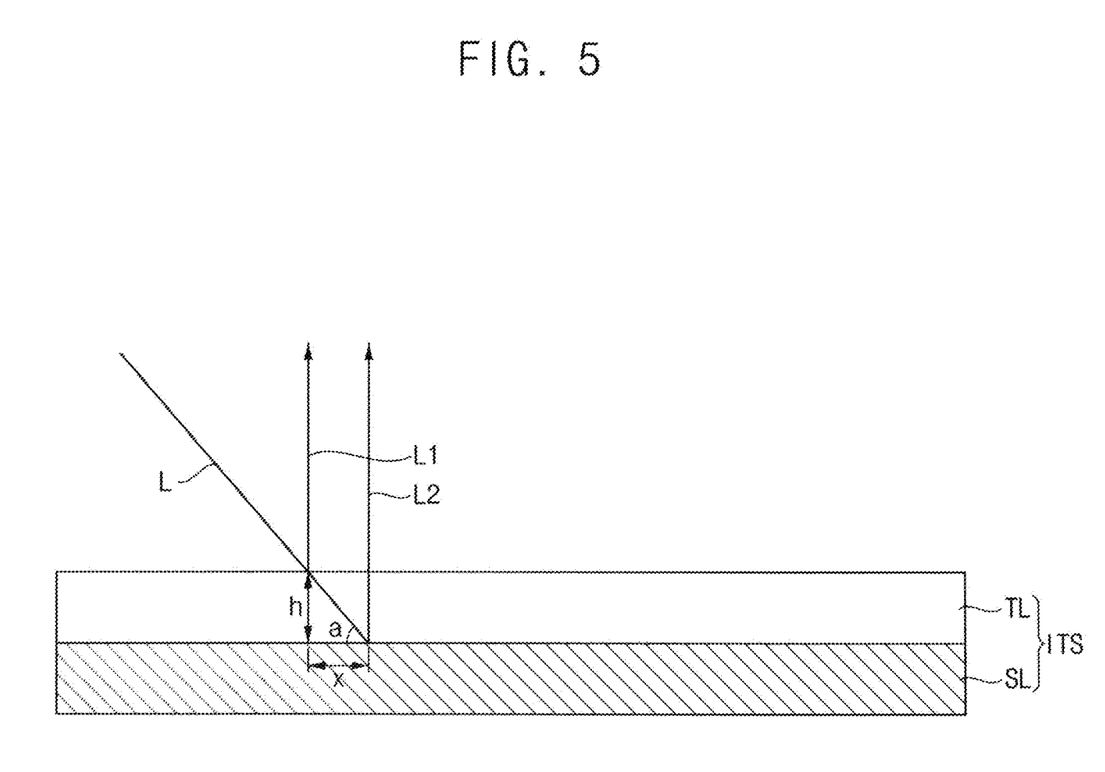
FIG. 5 is a diagram schematically illustrating a method of measuring a separation distance by a separation distance measuring part included in the inspection apparatus of FIG. 2.

The separation distance measuring part 500 may measure the separation distance x based on the angle a between the laser L and the inspection target substrate ITS and the vertical thickness h of the transmission layer TL. For example, the separation distance x may be measured by the equation below.

$$x = \frac{h}{\tan(a)} \quad \text{[Equation]}$$

Figure 6:
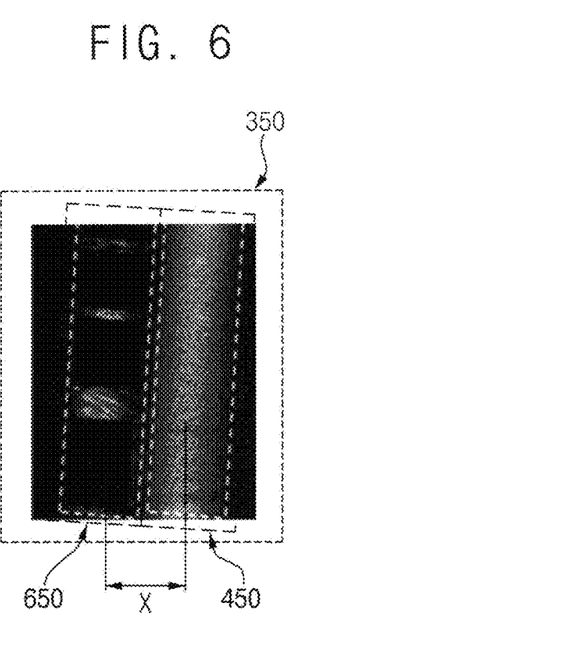
FIG. 6 is a diagram schematically illustrating a sub-image obtained by a sub-image obtaining part included in the inspection apparatus of FIG. 2.

The sub-image obtaining part 600 may obtain the sub-image 650 by reflecting the separation distance x in the first image obtained from the first emitted laser L1. In other words, the sub-image 650 may be an image in which the separation distance x is reflected in the first image with respect to the reference image 450. As the reference image 450 is used as a reference, even if the inspection target substrate ITS is bent or tilted, a position of a foreign material may be accurately detected.

Figure 7:
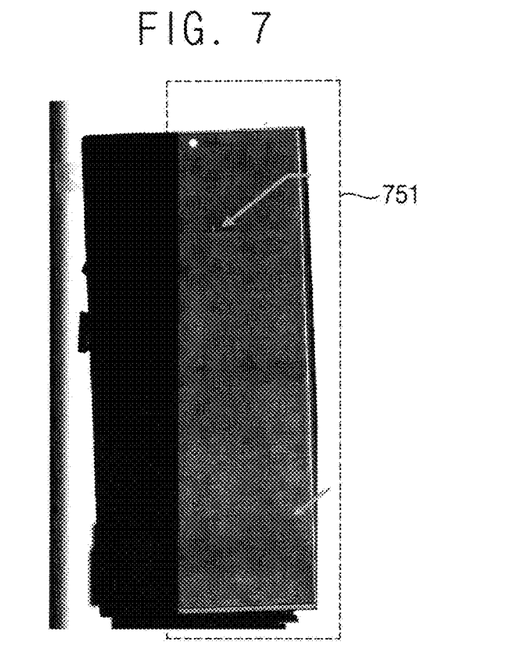
FIG. 7 is a diagram schematically illustrating a reference image merged by the image merging part included in the inspection apparatus of FIG. 2.
Figure 8:
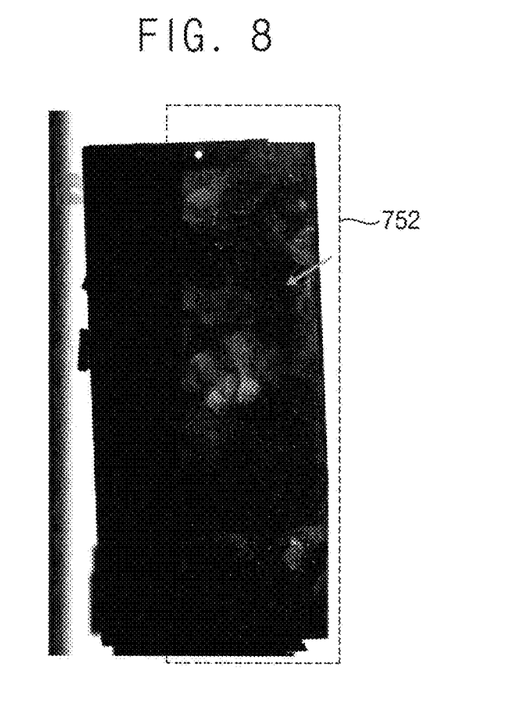
FIG. 8 is a diagram schematically illustrating a sub-image merged by the image merging part included in the inspection apparatus of FIG. 2.

The image merging part 700 may merge the obtained sub-image 650 with the reference image 450. Accordingly, the position of the foreign material may be accurately detected based on the reference image 350.

Referring back to FIGS. 1 and 2, the laser generator 100 may irradiate the laser L to the inspection target substrate ITS (S100). The laser L may be irradiated to have an angle a with respect to the inspection target substrate ITS.

The laser L may be reflected from the transmission layer TL and the scattering layer SL, respectively, and may be incident on the imaging part 200 (S200). In an embodiment, the first emitted laser L1 reflected from the transmission layer TL and the second emitted laser L2 reflected from the scattering layer SL may be incident on the imaging part 200.

FIG. 3 is a diagram schematically illustrating an image stream obtained by an image stream obtaining part included in the inspection apparatus of FIG. 2.

Referring to FIGS. 1 to 3, the image stream obtaining part 300 may obtain the image stream 350 from the first emitted laser L1 and the second emitted laser L2 (S300). As described above, the image stream 350 may represent the first image obtained from the first emitted laser L1 and the second image obtained from the second emitted laser L2 as an image.

FIG. 4 is a diagram schematically illustrating a reference image detected by a reference image detector included in the inspection apparatus of FIG. 2.

Referring to FIGS. 1, 2, and 4, the reference image detector 400 may detect the reference image 450, having the uniform pattern, from the image stream 350 (S400). As described above, the reference image 450 may be an image reflected from the scattering layer SL.

FIG. 5 is a diagram schematically illustrating a method of measuring a separation distance by a separation distance measuring part included in the inspection apparatus of FIG. 2.

Referring to FIGS. 1, 2, and 5, the separation distance measuring part 500 may measure the separation distance x, based on the angle a between the laser L and the inspection target substrate ITS and the vertical thickness h of the inspection target substrate ITS (S500).

FIG. 6 is a diagram schematically illustrating a sub-image obtained by a sub-image obtaining part included in the inspection apparatus of FIG. 2.

Referring to FIGS. 1, 2, and 6, the sub-image obtaining part 600 may obtain the sub-image 650 by reflecting the separation distance x in the first image obtained from the first emitted laser L1 (S600).

FIG. 7 is a diagram schematically illustrating a reference image merged by the image merging part included in the inspection apparatus of FIG. 2. FIG. 8 is a diagram schematically illustrating a sub-image merged by the image merging part included in the inspection apparatus of FIG. 2.

Referring to FIGS. 1, 2, and 7, the image merging part 700 may obtain a merged reference image 751 by merging the reference image 450. The merged reference image 751 may be an image obtained from the scattering layer SL in an inspection target area.

Referring to FIGS. 1, 2, and 8, the image merging part 700 may obtain a merged sub-image 752 by merging the sub-image 650. The merged sub-image 752 may be a sub-image 650 in which the separation distance x is reflected. Since the separation distance x depends on the angle a and the vertical thickness h, and does not depend on the position and/or angle of the inspection target substrate ITS, the foreign material (e.g., a position of the foreign material) detected from the sub-image 650 may be accurately detected from the reference image 450.

Figure 9:
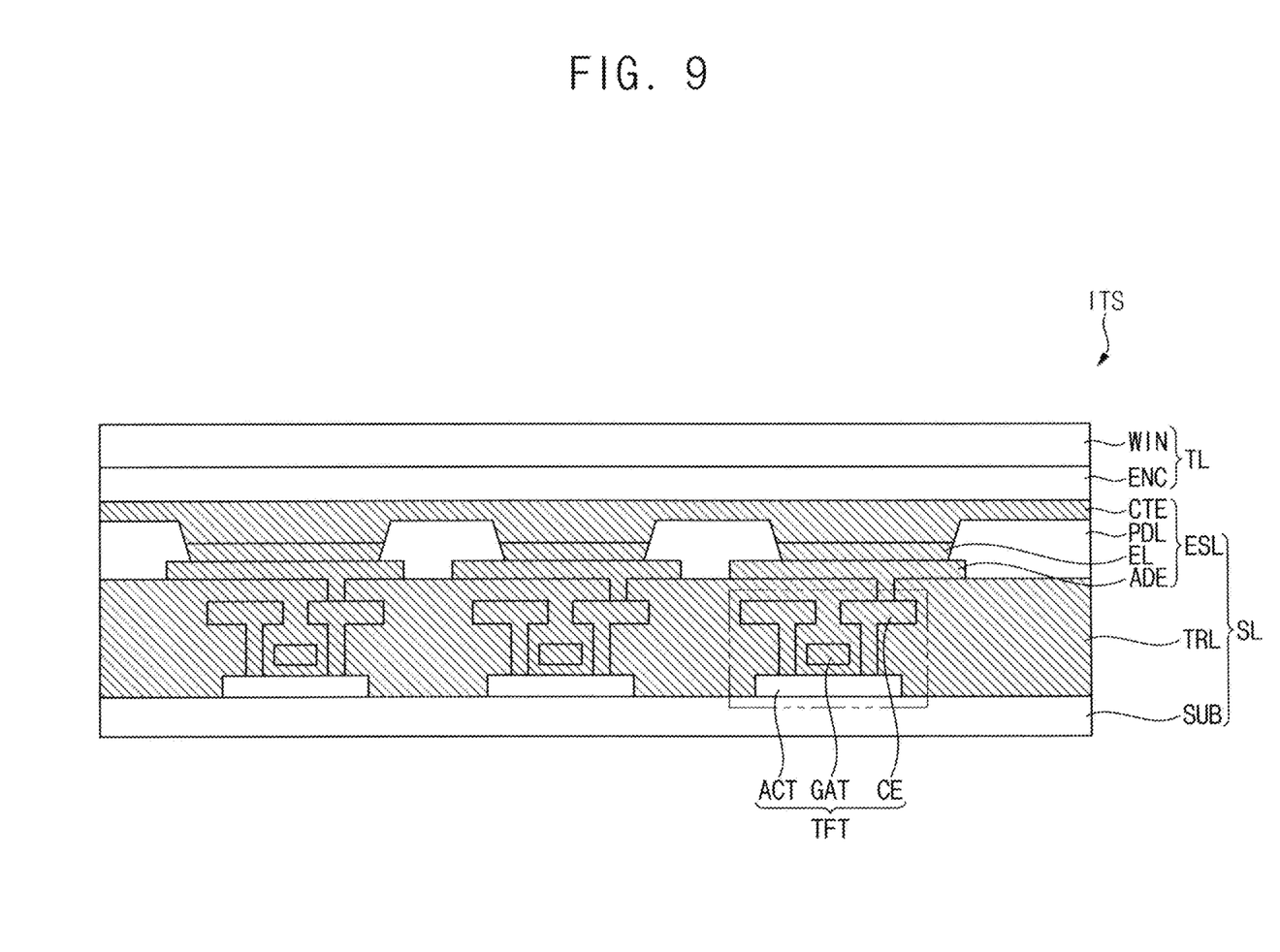
FIG. 9 is a cross-sectional view schematically illustrating an example of an inspection target of FIG. 2.

FIG. 9 is a cross-sectional view schematically illustrating an example of an inspection target substrate of FIG. 2.

Referring to FIGS. 2 and 9, in an embodiment, the inspection target substrate ITS may be a display device. The inspection target substrate ITS may include at least one of the scattering layer SL and the transmission layer TL. The scattering layer SL may include at least one of a substrate SUB, a transistor layer TRL, and a light emitting diode layer ESL, and the transmission layer TL may include an encapsulation layer ENC and a window WIN.

The substrate SUB may include at least one of glass, quartz, plastic, and the like, or a combination thereof. For example, the substrate SUB may be a plastic substrate and may include polyimide (PI). In an embodiment, the substrate SUB may have a structure in which at least one polyimide layer and at least one barrier layer are alternately stacked each other.

The transistor layer TRL may be disposed on the substrate SUB. At least one transistor TFT may be formed in the transistor layer TRL. The transistor TFT may include an active pattern ACT, a gate electrode GAT, and a connection electrode CE.

The active pattern ACT may be disposed on the substrate SUB. For example, the active pattern ACT may at least one of include a silicon semiconductor, an oxide semiconductor, and the like, or a combination thereof. The silicon semiconductor may include at least one of amorphous silicon, polycrystalline silicon, and the like, or a combination thereof. The active pattern ACT may pass a current or block a current according to a gate signal provided to the gate electrode GAT.

The gate electrode GAT may include at least one of a metal, an alloy, a conductive metal oxide, and the like, or a combination thereof, and may be disposed on the active pattern ACT. For example, the gate electrode GAT may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like, or a combination thereof. These may be used alone or in combination with each other.

The connection electrode CE may include at least one of a metal, an alloy, a conductive metal oxide, and the like, or a combination thereof, and may be disposed on the gate electrode GAT. The connection electrode CE may contact the active pattern ACT. For example, the connection electrode CE may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like, or a combination thereof. These may be used alone or in combination with each other.

The light emitting diode layer ESL may include at least one of an anode electrode ADE, a pixel defining layer PDL, an organic light emitting layer EL, and a cathode electrode CTE.

The anode electrode ADE may be disposed on the connection electrode CE and may contact the connection electrode CE. The anode electrode ADE may include at least one of a metal, an alloy, a conductive metal oxide, and the like, or a combination thereof. For example, the anode electrode ADE may include at least one of silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like, or a combination thereof. These may be used alone or in combination with each other.

The pixel defining layer PDL may be disposed on the anode electrode ADE. An opening exposing a portion of the anode electrode ADE may be formed in the pixel defining layer PDL. For example, the pixel defining layer PDL may be formed of an organic material such as polyimide-based resin (e.g., photosensitive polyimide-based resin (PSPI)), photoresist, polyacrylic resin, or acrylic resin, or an inorganic material such as silicon oxide and silicon nitride.

The organic light emitting layer EL may be disposed in the opening on the anode electrode ADE. The organic light emitting layer EL may be disposed between the anode electrode ADE and the cathode electrode CTE to emit light.

The cathode electrode CTE may be disposed on the organic light emitting layer EL. The cathode electrode CTE may be a plate electrode. In other words, the cathode electrode CTE may be formed on the entire surface of the display device.

The encapsulation layer ENC may be disposed on the cathode electrode CTE. The encapsulation layer ENC may prevent penetration of moisture and oxygen from the outside. For example, the encapsulation layer ENC may have a structure in which an inorganic layer and an organic layer are stacked each other.

The window WIN may be disposed on the encapsulation layer ENC. The window WIN may include at least one of glass, plastic, etc., and may buffer external impact.

Figure 10:
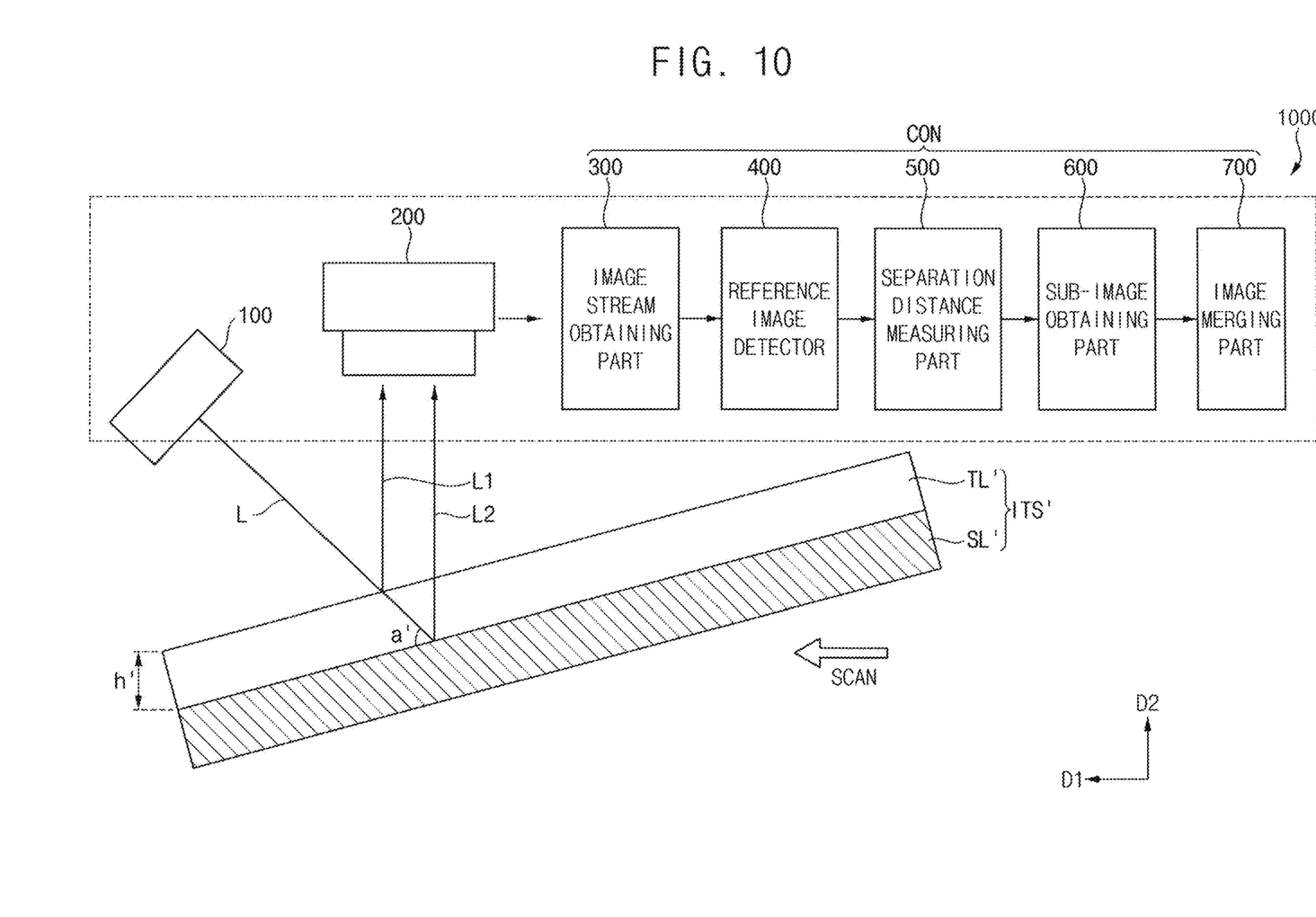
FIG. 10 is a conceptual diagram schematically illustrating an inspection apparatus for performing the inspection method of FIG. 1.

FIG. 10 is a conceptual diagram schematically illustrating an inspection apparatus for performing the inspection method of FIG. 1.

Referring to FIGS. 1 and 10, the inspection apparatus 1000 may detect a foreign material from an inspection target substrate ITS', and the inspection target substrate ITS' may be tilted in a direction between the first direction D1 and the second direction D2. As described above, in the inspection method S1000, as the separation distance x depends on a vertical thickness h' of a transmission layer TL' and an angle a' formed between the laser L and the inspection target substrate ITS', and does not depend on the position and/or angle of the inspection target substrate ITS', the position of the foreign material detected from the sub-image may be accurately detected from the reference image even with respect to the inspection target substrate ITS' which is tilted.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An inspection method comprising:
   irradiating a laser to an inspection target;
   reflecting a first emitted laser from a transmission layer included in the inspection target;
   reflecting a second emitted laser from a scattering layer included in the inspection target;
   detecting a reference image from the second emitted laser; and
   measuring a separation distance obtained from the first emitted laser based on the reference image.

2. The inspection method of claim 1, wherein the irradiating of the laser includes irradiating the laser to have an angle with respect to the inspection target.

3. The inspection method of claim 1, wherein the first emitted laser and the second emitted laser do not intersect each other.

4. The inspection method of claim 1, further comprising:
   obtaining an image stream from the first emitted laser and the second emitted laser.

5. The inspection method of claim 4, further comprising:
   detecting the reference image having a uniform pattern in the image stream.

6. The inspection method of claim 1, wherein the measuring of the separation distance includes measuring the separation distance based on an angle and between the laser and the inspection target and a vertical thickness of the transmission layer.

7. The inspection method of claim 1, further comprising:
   obtaining a sub-image by reflecting the separation distance in an image obtained from the first emitted laser.

8. The inspection method of claim 7, further comprising:
   merging the sub-image obtained by reflecting the separation distance with the image obtained from the first emitted laser.

9. An inspection apparatus comprising:
   a laser generator that irradiates a laser to an inspection target;
   an imaging part on which a first emitted laser and a second emitted laser are incident; and
   a controller that measures a separation distance obtained from the first emitted laser, based on a reference image obtained from the second emitted laser, wherein
   the first emitted laser is a laser reflected from a transmission layer included in the inspection target, and
   the second emitted laser is a laser reflected from a scattering layer included in the inspection target.

10. The inspection apparatus of claim 9, wherein the laser is irradiated to have an angle with respect to the inspection target.

11. The inspection apparatus of claim 9, wherein the first emitted laser and the second emitted laser do not intersect each other.

12. The inspection apparatus of claim 9, wherein the controller includes:
    an image stream obtaining part that obtains an image stream from the first emitted laser and the second emitted laser.

13. The inspection apparatus of claim 12, wherein the controller further includes a reference image detector that detects the reference image having a uniform pattern in the image stream.

14. The inspection apparatus of claim 9, wherein the controller includes a separation distance measuring part that measures the separation distance based on an angle between the laser and the inspection target and a vertical thickness of the transmission layer.

15. The inspection apparatus of claim 9, wherein the controller includes a sub-image obtaining part that obtains a sub-image by reflecting the separation distance in an image obtained from the first emitted laser.

16. The inspection apparatus of claim 15, wherein the controller further includes an image merging part that merges the sub-image obtained by reflecting the separation distance in the image obtained from the first emitted laser.

17. The inspection apparatus of claim 16, wherein the first and second emitted lasers reflected from the inspection target inclined with respect to the imaging part are incident on the imaging part.

18. The inspection apparatus of claim 14, wherein the separation distance is measured by the following equation:

$$x = \frac{h}{\tan(a)}$$

wherein x is the separation distance, h is the vertical thickness of the transmission layer, and a is the angle between the laser and the inspection target substrate.

19. The inspection method of claim 6, wherein the separation distance is measured by the following equation:

$$x = \frac{h}{\tan(a)}$$

wherein x is the separation distance, h is the vertical thickness of the transmission layer, and a is the angle between the laser and the inspection target substrate.

* * * * *